United States Patent
Fukami

(10) Patent No.: US 10,458,388 B2
(45) Date of Patent: Oct. 29, 2019

(54) WIND TURBINE BLADE, WIND TURBINE ROTOR, WIND TURBINE POWER GENERATING APPARATUS, AND METHOD OF MOUNTING VORTEX GENERATOR

(71) Applicant: MITSUBISHI HEAVY INDUSTRIES, LTD., Tokyo (JP)

(72) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 189 days.

(21) Appl. No.: 15/634,541

(22) Filed: Jun. 27, 2017

(65) Prior Publication Data

US 2018/0038341 A1    Feb. 8, 2018

(30) Foreign Application Priority Data

Aug. 8, 2016   (JP) .................................. 2016-155525

(51) Int. Cl.
*F03D 1/06*       (2006.01)
*F03D 9/25*       (2016.01)

(52) U.S. Cl.
CPC ......... *F03D 1/0633* (2013.01); *F03D 1/0675* (2013.01); *F03D 9/25* (2016.05);
(Continued)

(58) Field of Classification Search
CPC ........ F03D 1/0633; F03D 1/0675; F03D 9/25; Y02P 70/523; F05B 2220/706;
(Continued)

(56) References Cited

U.S. PATENT DOCUMENTS 8,162,590 B2   4/2012   Haag
9,051,919 B2   6/2015   Jensen et al.
(Continued)

FOREIGN PATENT DOCUMENTS

CN       204984715 U    1/2016
DE    102013201871 A1   8/2014
(Continued)

OTHER PUBLICATIONS

Europe Patent Office, "Search Report for European Patent Application No. 17173247.2," dated Nov. 30, 2017.
(Continued)

*Primary Examiner* — Richard A Edgar
(74) *Attorney, Agent, or Firm* — Manabu Kanesaka; Benjamin Hauptman; Kenneth Berner

(57) ABSTRACT

A wind turbine blade includes a blade body; and a vortex generator mounted to a surface of the blade body. The vortex generator includes a plurality of fin sets, each fin set including a plurality of fins disposed to protrude from the surface of the blade body at different positions from one another in a blade spanwise direction. The plurality of fin sets is positioned so that, in a planar development view of the surface of the blade body, an angle θ formed by a center axis of a blade root of the blade body with a line connecting two of the fin sets which are adjacent in the blade spanwise direction increases toward the blade root, at least in a part of a region of the blade body between a position of the blade root and a maximum chord-length position of the blade body in the blade spanwise direction.

15 Claims, 5 Drawing Sheets

(52) U.S. Cl.
CPC ..... *F05B 2220/706* (2013.01); *F05B 2230/50* (2013.01); *F05B 2240/122* (2013.01); *F05B 2240/2211* (2013.01); *F05B 2240/30* (2013.01); *Y02E 10/721* (2013.01); *Y02E 10/725* (2013.01); *Y02P 70/523* (2015.11)

(58) Field of Classification Search
CPC ............ F05B 2230/50; F05B 2240/122; F05B 2240/2211; F05B 2240/30; Y02E 10/721; Y02E 10/725
See application file for complete search history.

(56) References Cited

U.S. PATENT DOCUMENTS

| | | |
|---|---|---|
| 9,133,816 B2 | 9/2015 | Jensen et al. |
| 9,273,667 B2 | 3/2016 | Enevoldsen et al. |
| 9,556,849 B2 | 1/2017 | Riddell et al. |
| 2008/0317600 A1 | 12/2008 | Enevoldsen et al. |
| 2011/0142673 A1 | 6/2011 | Fang et al. |
| 2012/0151769 A1 | 6/2012 | Brake et al. |
| 2012/0189444 A1 | 7/2012 | Haag |
| 2012/0257977 A1 | 10/2012 | Jensen et al. |
| 2014/0093382 A1 | 4/2014 | Fuglsang |
| 2014/0140856 A1 | 5/2014 | Madsen et al. |
| 2014/0241880 A1 | 8/2014 | Madsen |
| 2014/0328688 A1 | 11/2014 | Wilson et al. |
| 2014/0328692 A1 | 11/2014 | Riddell et al. |
| 2015/0010407 A1 | 1/2015 | Zamora Rodriguez et al. |
| 2015/0132135 A1* | 5/2015 | Booth ................ F01D 5/30 416/204 R |
| 2016/0215758 A1 | 7/2016 | Corten |
| 2016/0252073 A1 | 9/2016 | Fuglsang et al. |
| 2017/0138339 A1 | 5/2017 | Fukami |
| 2017/0138341 A1 | 5/2017 | Fukami |
| 2017/0248116 A1 | 8/2017 | Fukami et al. |
| 2017/0248117 A1 | 8/2017 | Fukami et al. |

FOREIGN PATENT DOCUMENTS

| | | | |
|---|---|---|---|
| DE | 102014203442 A1 * | 5/2015 | ........... F03D 1/0641 |
| EP | 2031241 A1 | 3/2009 | |
| EP | 2484895 A1 | 8/2012 | |
| EP | 2484896 A1 | 8/2012 | |
| EP | 2484897 A1 | 8/2012 | |
| EP | 2484898 A1 | 8/2012 | |
| EP | 1944505 B1 | 11/2012 | |
| EP | 2548800 A1 | 1/2013 | |
| EP | 2597300 A1 | 5/2013 | |
| EP | 2799709 A1 | 11/2014 | |
| EP | 2799710 A1 | 11/2014 | |
| JP | 2014-070638 A | 4/2014 | |
| JP | 2017-089526 A | 5/2017 | |
| JP | 2017-089561 A | 5/2017 | |
| WO | 01/16482 A1 | 3/2001 | |
| WO | 2007/140771 A1 | 12/2007 | |
| WO | 2015/030573 A1 | 3/2015 | |
| WO | 2015/132884 A1 | 9/2015 | |

OTHER PUBLICATIONS

Japan Patent Office, "Office Action for Japanese Patent Application No. 2016-155525," dated Feb. 3, 2017.

* cited by examiner

WIND TURBINE BLADE, WIND TURBINE ROTOR, WIND TURBINE POWER GENERATING APPARATUS, AND METHOD OF MOUNTING VORTEX GENERATOR

RELATED APPLICATIONS

The present application is based on, and claims priority from, Japanese Application No. JP2016-155525 filed Aug. 8, 2016, the disclosure of which is hereby incorporated by reference herein in its entirety.

TECHNICAL FIELD

The present disclosure relates to a wind turbine blade, a wind turbine rotor, a wind turbine power generating apparatus, and a method of mounting a vortex generator.

BACKGROUND ART

To improve the aerodynamic performance of a wind turbine blade to improve the operational efficiency of a wind turbine, a vortex generator is mounted to a surface of a wind turbine blade in some cases to suppress separation of a flow along the surface of the wind turbine blade. Further, various approaches have been made in relation to the arrangement of vortex generators on a surface of a wind turbine blade, to improve the aerodynamic performance of wind turbine blades.

For instance, Patent Document 1 discloses a vortex generator with fins for generating vortices that suppress separation of a flow along a surface of a wind turbine blade, the fins arranged linearly along the blade spanwise direction of the wind turbine blade.

Further, Patent Documents 2 and 3 disclose a vortex generator with such fins arranged along a line that is inclined at a predetermined angle from the pitch axis.

CITATION LIST

Patent Literature

Patent Document 1: EP2799710A
Patent Document 2: US Patent Application Publication No. 2014/0140856
Patent Document 3: EP2548800A

SUMMARY

The operational efficiency of a wind turbine is expected to improve through appropriate selection of an arrangement of fins of a vortex generator disposed on a surface of a wind turbine blade.

However, Patent Documents 1 to 3 do not mention any specific consideration on the relationship between the arrangement of fins on the surface of the wind turbine blade and the wind-turbine operational efficiency.

In view of the above, an object of at least one embodiment of the present invention is to provide a wind turbine blade, a wind turbine rotor, a wind turbine power generating apparatus, and a method of mounting a vortex generator, whereby the wind-turbine operational efficiency improves.

(1) A wind turbine blade according to at least one embodiment of the present invention comprises: a blade body; and a vortex generator mounted to a surface of the blade body. The vortex generator includes a plurality of fin sets, each fin set including a plurality of fins disposed so as to protrude from the surface of the blade body at different positions from one another in a blade spanwise direction. The plurality of fin sets is positioned so that, in a planar development view of the surface of the blade body, an angle θ formed by a center axis of a blade root of the blade body with a line connecting two of the fin sets which are adjacent in the blade spanwise direction increases toward the blade root, at least in a part of a region of the blade body between a position of the blade root and a maximum chord-length position of the blade body in the blade spanwise direction.

In the present specification, "blade spanwise direction" refers to a direction connecting the blade root and the blade tip of the blade body. Further, in the present specification, "chord length" of a wind turbine blade refers to the length of a line (chord) that connects the leading edge and the trailing edge of the blade body at a position in the blade spanwise direction.

As a result of intensive researches by the present inventors, it was found that, in a region on the side of the blade root of the wind turbine blade, with distance toward the blade root of the wind turbine blade along the blade spanwise direction of the wind turbine blade, a wind flow separates on the surface of the wind turbine blade at a position closer to the leading edge, and the degree of change in the position of separation relative to a change in the position in the blade spanwise direction is greater.

The reason is considered to be as follows. That is, at least in a partial region between the position of the blade root and the maximum chord-length position in the blade spanwise direction of the wind turbine blade, the shape of the leading-edge side of the wind turbine blade can be approximated by a cylinder. Further, in this region, the tip speed decreases with distance toward the blade root of the wind turbine blade along the blade spanwise direction of the wind turbine blade, and thereby the relative inflow angle of wind (angle formed by the tip-speed vector and the relative inflow speed vector) increases. Thus, with distance toward the blade root of the wind turbine blade, the position of separation of a wind flow on the surface of the wind turbine blade becomes closer to the leading-edge side in response to an increase in the relative inflow angle of wind. Further, since the amount of change in the relative inflow angle of wind with respect to a change in the blade spanwise directional position increases with distance toward the blade root, the degree of change in the position of separation increases with respect to a change in the blade spanwise directional position.

In this regard, with the above configuration (1), the plurality of fin sets constituting the vortex generator are positioned so that, in a planar development view of the surface of the blade body, the angle θ formed by the center axis of the blade root and the line connecting two adjacent fin sets in the blade spanwise direction increases toward the blade root, in at least a part of a region between the position of the blade root and the maximum chord-length position in the blade spanwise direction of the blade body. Accordingly, with the above configuration (1), the fins are disposed corresponding to the position of separation of a flow that changes in response to the change in the position in the blade spanwise direction, and thereby it is possible to effectively retard the separation of flow on the surface of the wind turbine blade. Thus, it is possible to improve the operational efficiency of the wind turbine.

(2) In some embodiments, in the above configuration (1), the plurality of fin sets is positioned so that the angle θ satisfies, in at least a part of the region between the position of the blade root and the maximum chord-length position, the following expression (A):

$$3° \leq \theta \leq \frac{d}{2\lambda\mu^2 R} \times \frac{180}{\pi} [°] \quad (A)$$

where d is an outer diameter of the blade body at the position of the blade root, λ is a design tip speed ratio of a wind turbine to which the wind turbine blade is mounted, R is a distance between a rotational center of a wind turbine rotor including the wind turbine blade and a tip of the blade body, r is a distance between the rotational center and the fin set which is disposed closer to the blade root of the two adjacent fin sets, and μ is a dimensionless radial position being a ratio (r/R) of r to R.

As a result of intensive researches by the present inventors, it was found that, in the region near the blade root in the blade spanwise direction of a wind turbine blade, a flow separates on the blade surface at a position corresponding to the angle ψ represented by the following expression (B) in a planar development view of the surface of the blade body, as described below. Further, it was found that, from the following expression (B), the position of separation on the blade surface changes corresponding to the dimensionless radial position μ.

$$\psi = \frac{d}{2\lambda\mu^2 R} \times \frac{180}{\pi} [°] \quad (B)$$

In this regard, with the above configuration (2), the angle θ is at most ψ expressed by the above expression (B), and thus the fins are positioned closer to the leading edge than the position at which a flow separates on the blade surface, which makes it possible to retard separation of a flow on the blade surface more effectively. Further, with the above configuration (2), the angle θ is at least 3°, and thus it is possible to achieve a sufficient effect to retard separation of a flow on the surface of the wind turbine blade, even at a position relatively close to the tip.

(3) In some embodiments, in the above configuration (2), the plurality of fin sets is positioned so that the angle θ satisfies an expression θ≤(0.0034/μ²)×(180/π) [°].

(4) In some embodiments, in the above configuration (2) or (3), the plurality of fin sets is positioned so that the angle θ satisfies an expression θ≥(0.0021/μ²)×(180/π) [°].

For a typical wind turbine blade, if the angle θ satisfies an expression θ≤(0.0034/μ²)×(180/π) [°], the angle θ is prevented from being excessively large with respect to the amount of change in the position of separation relative to the change in the position in the blade spanwise direction, and thus it is possible to enjoy the effect to retard separation in a wider range in the blade spanwise direction at the blade root. Furthermore, with a typical wind turbine blade, if the angle θ satisfies an expression θ≥(0.0021/μ²)×(180/π) [°], the angle θ is prevented from being excessively small with respect to the amount of change in the position of separation relative to the change in the position in the blade spanwise direction, and thus it is possible enjoy the effect to retard separation in a wider range in the blade spanwise direction at the blade root.

Accordingly, with the above configuration (3) or (4), it is possible to effectively retard the separation of flow on the surface of the wind turbine blade. Thus, it is possible to improve the operational efficiency of the wind turbine.

(5) In some embodiments, in any one of the above configurations (1) to (4), the plurality of fin sets is positioned so that the angle θ increases toward the blade root, in a range where μ satisfies an expression 0.10≤μ≤0.15, where R is a distance between a rotational center of a wind turbine rotor including the wind turbine blade and a tip of the blade body, r is a distance between the rotational center and the fin set which is disposed closer to the blade root of the two adjacent fin sets, and μ is a dimensionless radial position being a ratio (r/R) of r to R.

For a typical wind turbine blade, the region where μ satisfies an expression 0.10≤μ is positioned away by some distance from the installation position of the wind turbine blade to the hub, and thus it is possible to expect some effect to improve the performance of the wind turbine from mounting the vortex generator to the wind turbine blade. For a typical wind turbine blade, in the region where μ satisfies an expression μ≤0.15, the shape on the side of the leading edge of the wind turbine blade can be approximated accurately by a cylinder, and thus it is possible to achieve the effect described in the above (1).

Accordingly, with the above configuration (5), the fins are provided in a region suitable for effectively retarding the separation of flow on the surface of the wind turbine blade. Thus, it is possible to improve the operational efficiency of the wind turbine effectively.

(6) In some embodiment, in any one of the above configurations (1) to (5), the plurality of fins is positioned so that the angle θ increases toward the blade root, at least in a region in the blade spanwise direction in which a blade thickness ratio (t/c) satisfies an expression 70%≤(t/c)≤85%, the blade thickness ratio (t/c) being a ratio of a blade thickness t of the blade body to a chord length c of the blade body.

For a typical wind turbine blade, the region where the blade thickness ratio (t/c) satisfies an expression (t/c)≤85% is positioned away by some distance from the installation position of the wind turbine blade to the hub, and thus it is possible to expect some effect to improve the performance of the wind turbine from mounting the vortex generator to the wind turbine blade. For a typical wind turbine blade, in the region where the blade thickness ratio (t/c) satisfies an expression 70%≤(t/c), the shape on the side of the leading edge of the wind turbine blade can be approximated accurately by a cylinder, and thus it is possible to achieve the effect described in the above (1).

Accordingly, with the above configuration (6), the fins are provided in a region suitable for effectively retarding the separation of a flow on the surface of the wind turbine blade. Thus, it is possible to improve the operational efficiency of the wind turbine effectively.

(7) In some embodiments, in any one of the above configurations (1) to (6), each of the plurality of fin sets comprises a VG unit including: a platform portion fixed to the surface of the blade body; and one or two of the fins erected on the platform portion.

With the above configuration (7), the fin set comprises the VG unit including the platform portion fixed to the surface of the blade body and the one or two fins erected on the platform portion. Accordingly, it is possible to arrange the fins flexibly by the unit of the VG unit on the blade surface of the wind turbine, and thereby it is possible to effectively retard separation of a flow on the surface of the wind turbine blade and to improve the operational efficiency of the wind turbine.

(8) In some embodiments, in any one of the above configurations (1) to (7), the vortex generator is disposed, on a suction surface of the blade body, in a turbulence region of a wind flow along the suction surface.

Separation of a flow at the suction surface of the wind turbine blade takes place due to gradual thickening of a boundary layer from a streamline flow region in the vicinity of the leading edge toward a turbulent flow region downstream thereof, and the flow being separated before arriving at the trailing edge.

In this regard, with the above configuration (8), the vortex generator is disposed within a turbulent flow region of a wind flow along the suction surface, and thereby it is possible to suppress separation of a flow from the suction surface.

(9) A wind turbine rotor according to at least one embodiment of the present invention comprises: the wind turbine blade according to any one of the above (1) to (8); and a hub to which the wind turbine blade is mounted.

With the above configuration (9), the plurality of fin sets constituting the vortex generator are positioned so that the angle θ formed by the center axis of the blade root and the line connecting two adjacent fin sets in the blade spanwise direction in a planar development view of the surface of the blade body increases toward the blade root, in at least a part of a region between the position of the blade root and the maximum chord-length position in the blade spanwise direction of the blade body. Accordingly, with the above configuration (9), the fins are disposed corresponding to the position of separation of a flow that changes in response to the change in the position in the blade spanwise direction, and thereby it is possible to effectively retard the separation of a flow on the surface of the wind turbine blade. Thus, it is possible to improve the operational efficiency of the wind turbine.

(10) A wind turbine power generating apparatus according to at least one embodiment of the present invention comprises the wind turbine rotor according to the above (9).

With the above configuration (10), the plurality of fin sets constituting the vortex generator are positioned so that the angle θ formed by the center axis of the blade root and the line connecting two adjacent fin sets in the blade spanwise direction in a planar development view of the surface of the blade body increases toward the blade root, in at least a part of a region between the position of the blade root and the maximum chord-length position in the blade spanwise direction of the blade body. Accordingly, with the above configuration (10), the fins are disposed corresponding to the position of separation of a flow that changes in response to the change in the position in the blade spanwise direction, and thereby it is possible to effectively retard the separation of a flow on the surface of the wind turbine blade. Thus, it is possible to improve the operational efficiency of the wind turbine.

(11) A method of mounting a vortex generator to a surface of a wind turbine blade, the vortex generator comprising a plurality of fin sets each of which includes a plurality of fins, according to at least one embodiment of the present invention, comprises: a step of mounting the plurality of fin sets to the wind turbine blade so that the plurality of fins protrude from the surface of the wind turbine blade at positions different from one another in a blade spanwise direction, and, in a planar development view of the surface of the wind turbine blade, an angle θ formed by a center axis of a blade root of the wind turbine blade with a line connecting two of the plurality of fin sets which are adjacent in the blade spanwise direction increases toward the blade root, at least in a part of a region of the wind turbine blade between a position of the blade root and a maximum chord-length position of the wind turbine blade in the blade spanwise direction.

According to the above method (11), the plurality of fin sets constituting the vortex generator are positioned so that the angle θ formed by the center axis of the blade root and the line connecting two adjacent fin sets in the blade spanwise direction in a planar development view of the surface of the wind turbine blade increases toward the blade root, in at least a part of a region between the position of the blade root and the maximum chord-length position in the blade spanwise direction of the wind turbine blade. Thus, according to the above method (11), the fins are disposed corresponding to the position of separation of a flow that changes in response to the change in the position in the blade spanwise direction, and thereby it is possible to effectively retard the separation of a flow on the surface of the wind turbine blade. Thus, it is possible to improve the operational efficiency of the wind turbine.

(12) In some embodiments, in the above method (11), the mounting step includes positioning the plurality of fin sets so that the angle θ satisfies, in at least a part of the region between the position of the blade root and the maximum chord-length position, the following expression (A):

$$3° \leq \theta \leq \frac{d}{2\lambda\mu^2 R} \times \frac{180}{\pi} [°] \qquad (A)$$

where d is an outer diameter of the wind turbine blade at the position of the blade root, λ is a design tip speed ratio of a wind turbine to which the wind turbine blade is mounted, R is a distance between a rotational center of a wind turbine rotor including the wind turbine blade and a tip of the wind turbine blade, r is a distance between the rotational center and the fin set which is disposed closer to the blade root of the two adjacent fin sets, and μ is a dimensionless radial position being a ratio (r/R) of r to R.

According to the above method (12), the angle θ is at most ψ expressed by the above equation (B), and thus the fins are positioned closer to the leading edge than the position at which a flow separates on the blade surface, which makes it possible to retard separation of a flow on the blade surface more effectively. Further, according to the above method (12), the angle θ is at least 3°, and thus it is possible to achieve a sufficient effect to retard separation of a flow on the surface of the wind turbine blade, at a position relatively close to the tip.

(13) In some embodiments, in the above method (12), the mounting step includes positioning the plurality of fin sets so that the angle θ satisfies an expression θ≤(0.0034/μ²)×(180/π) [°].

(14) In some embodiments, in the above method (12) or (13), the mounting step includes positioning the plurality of fin sets so that the angle θ satisfies an expression θ≥(0.0021/μ²)×(180/π) [°].

For a typical wind turbine blade, if the angle θ satisfies an expression θ≤(0.0034/μ²)×(180/π) [°], the angle θ is prevented from being excessively large with respect to the amount of change in the position of separation relative to the change in the position in the blade spanwise direction, and thus it is possible to enjoy the effect to retard separation in a wider range in the blade spanwise direction at the blade root. Furthermore, for a typical wind turbine blade, if the angle θ satisfies an expression θ≥(0.0021/μ²)×(180/π) [°], the angle θ is prevented from being excessively small with respect to the amount of change in the position of separation relative to the change in the position in the blade spanwise direction, and thus it is possible enjoy the effect to retard separation in a wider range in the blade spanwise direction at the blade root.

Thus, according to the method (13) or (14), it is possible to effectively retard the separation of flow on the surface of the wind turbine blade. Thus, it is possible to improve the operational efficiency of the wind turbine.

(15) In some embodiments, in any one of the above methods (11) to (14), the mounting step includes positioning the plurality of fin sets so that the angle θ increases toward the blade root, in a range where μ satisfies an expression 0.10≤μ≤0.15, where R is a distance between a rotational center of a wind turbine rotor including the wind turbine blade and a tip of the blade body, r is a distance between the rotational center and the fin set which is disposed closer to the blade root of the two adjacent fin sets, and μ is a dimensionless radial position being a ratio (r/R) of r to R.

For a typical wind turbine blade, the region where μ satisfies an expression 0.10≤μ is positioned away by some distance from the installation position of the wind turbine blade to the hub, and thus it is possible to expect some effect to improve the performance of the wind turbine from mounting the vortex generator to the wind turbine blade. In a typical wind turbine blade, in the region where μ satisfies an expression μ≤0.15, the shape on the side of the leading edge of the wind turbine blade can be approximated accurately by a cylinder, and thus it is possible to achieve the effect described in the above (11).

Thus, according to the above method (15), the fins are provided in a region suitable for effectively retarding the separation of flow on the surface of the wind turbine blade. Thus, it is possible to improve the operational efficiency of the wind turbine effectively.

According to at least one embodiment of the present invention, provided is a wind turbine blade, a wind turbine rotor, a wind turbine power generating apparatus, and a method of mounting a vortex generator, whereby the wind-turbine operational efficiency can be improved.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
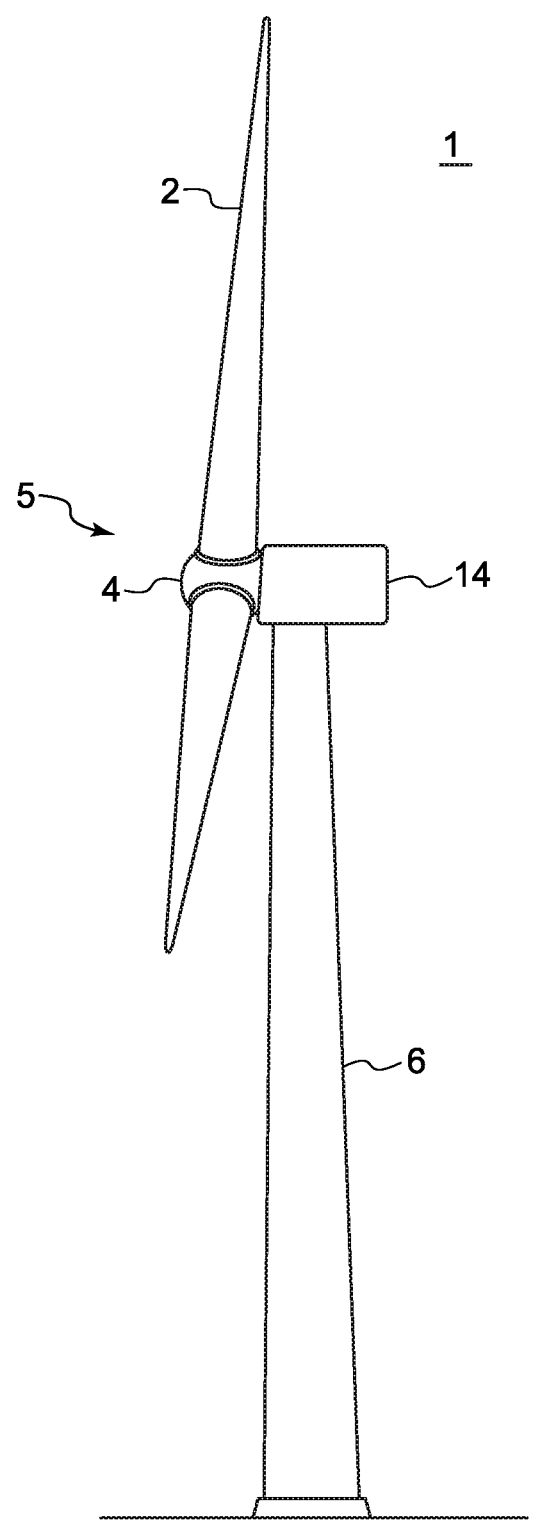
FIG. 1 is a schematic configuration diagram of a wind turbine power generating apparatus according to an embodiment.

FIG. 1 is a schematic configuration diagram of a wind turbine power generating apparatus to which a wind turbine blade according to some embodiments is applied. As depicted in FIG. 1, a wind turbine power generating apparatus 1 includes a rotor (wind turbine rotor) 5 including at least one (e.g. three) wind turbine blades 2 and a hub 4. The wind turbine blades 2 are mounted to the hub 4 in a radial fashion, the rotor 5 rotates in response to wind received by the wind turbine blades 2, and a generator (not depicted) coupled to the rotor 5 generates electric power.

In the embodiment depicted in FIG. 1, the rotor 5 is supported by a nacelle 14 disposed on an upper part of a tower 6. The tower 6 may be disposed to stand upright on a base structure like a foundation structure or a floating structure disposed on water or on land.

Figure 2:
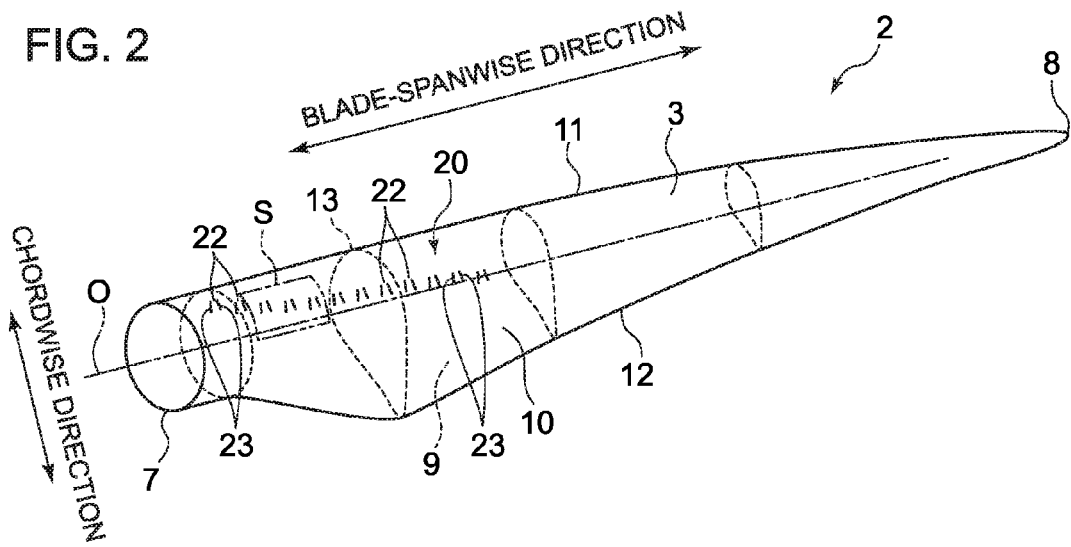
FIG. 2 is a perspective view of a wind turbine blade according to an embodiment.

FIG. 2 is a perspective view of the wind turbine blade 2 according to an embodiment. As depicted in FIG. 2, the wind turbine blade 2 includes a blade body 3 and a vortex generator 20 mounted to a surface (blade surface) of the blade body 3.

The blade body 3 includes a blade root 7 to be attached to the hub 4 of the wind turbine power generating apparatus 1, a blade tip 8 positioned farthest from the hub 4, and an airfoil part extending between the blade root 7 and the blade tip 8. The blade body 3 has a leading edge 11 and a trailing edge 12 extending from the blade root 7 to the blade tip 8. Further, an exterior shape of the blade body 3 is formed by a pressure surface 9 and a suction surface 10 that is disposed opposite to the pressure surface 9.

In FIG. 2, the cross-sectional shapes of the blade body 3 are shown by dotted lines, taken along the chord direction at some positions in the blade spanwise direction. Further, in FIG. 2, the reference numeral 13 indicates the maximum chord-length position of the blade body 3, and the reference sign O indicates the center axis of the blade root 7 that has a cylindrical shape. The center axis O extends substantially parallel to the blade spanwise direction.

The vortex generator 20 depicted in FIG. 2 includes a plurality of fin sets 22 each of which includes a pair of (e.g. two) fins 23. The fins 23 of the plurality of fin sets 22 constituting the vortex generator 20 protrude from the surface of the blade body 3 at different positions from one another in the blade spanwise direction.

A pair of fins 23 of each fin set 22 may be disposed symmetric with respect to a line in the chord direction.

In the present specification, "blade spanwise direction" refers to a direction connecting the blade root 7 and the blade tip 8, and "blade chordwise direction" refers to a direction along a line (chord) connecting the leading edge 11 and the trailing edge 12 of the blade body 3. Further, in the present specification, "chord length" of a wind turbine blade refers to the length of a line (chord) that connects the leading edge and the trailing edge of the blade body at a position in the blade spanwise direction.

Further, in the illustrative embodiment depicted in FIG. 2, each of the fin sets 22 constituting the vortex generator 20 is disposed on the side of the suction surface 10.

The fin set 22 including two fins 23 may be a VG unit described below.

In another embodiment, the fin set 22 may include three or more fins 23. In an embodiment, the fin set 22 may include two pairs of fins, or in other words, four fins in total.

Figure 3:
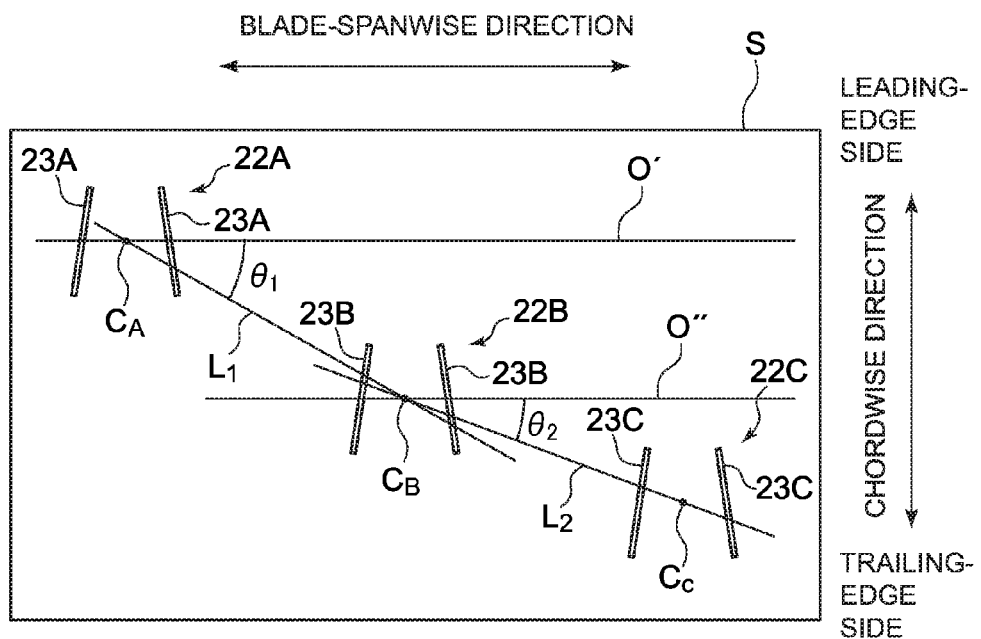
FIG. 3 is a planar development view of region S on the blade surface depicted in FIG. 2.

FIG. 3 is a planar development view of region S on the blade surface depicted in FIG. 2. As depicted in FIG. 2, the region S is disposed between the position of the blade root 7 and the maximum chord-length position 13, in the blade spanwise direction of the blade body 3.

In some embodiments, the pair of fins 23 constituting the fin set 22 have an airfoil shape. The fin 23 includes a leading edge 26 disposed on an upstream side with respect to the inflow direction of wind, a trailing edge 27 disposed on a downstream side with respect to the inflow direction of wind, a pressure surface 28 of the fin 23 facing toward upstream with respect to the inflow direction of wind, and a suction surface 29 of the fin 23 facing toward downstream with respect to the inflow direction of wind (see FIG. 7). In this fin 23, the direction of a line connecting the leading edge 26 and the trailing edge 27 is the chordwise direction of the fin 23.

In some embodiments, the fin 23 is disposed inclined from an inflow direction of wind at a predetermined angle.

For instance, in the vortex generator 20 depicted in FIG. 2 or 3, the fins 23, 23 are disposed so that a gap between the pair of fins 23, 23 widens from upstream toward downstream with respect to the inflow direction of wind (i.e., from the side of the leading edge 11 toward the side of the trailing edge 12 of the wind turbine blade 2 (see FIG. 2)).

In some embodiments, the fins 23, 23 may be disposed so that a gap between the pair of fins 23, 23 widens from downstream toward upstream with respect to the inflow direction of wind (i.e., from the side of the trailing edge 12 toward the side of the leading edge 11 of the wind turbine blade 2 (see FIG. 2)).

A function of the vortex generator 20 will now be described briefly.

Separation of a flow at the suction surface 10 of the wind turbine blade 2 takes place due to gradual thickening of a boundary layer from a streamline flow region in the vicinity of the leading edge 11 toward a turbulent flow region downstream thereof, and the flow being separated before arriving at the trailing edge 12.

The fin sets 22 of the vortex generator 20 mounted to the wind turbine blade 2 normally generates a longitudinal vortex on the side of the suction surface 29 of the fin 23 with a lift produced by the fin 23. Further, a flow flowing into the fin 23 forms a longitudinal vortex along an edge extending from the upstream-most position toward the top portion of the leading edge 26 of the fin 23, the top portion being disposed closer to the trailing edge 27 than the upstream-most position. The longitudinal vortex generated by the fin 23 promotes momentum exchange between outside and inside of a boundary layer on a surface of the wind turbine blade 2 in a height direction of the fin 23, at a downstream side of the fin set 22. Accordingly, the boundary layer on the surface of the wind turbine blade 2 reduces in thickness, and thereby trailing-edge separation on the wind turbine blade 2 is suppressed.

In some embodiments, the plurality of fin sets 22 are disposed so that, in a planar development view of the surface of the blade body 3, the angle θ formed by the center axis O of the blade root with a line connecting two adjacent fin sets 22 in the blade spanwise direction increases toward the blade root 7, in at least a part of a region between the position of the blade root 7 and the maximum chord-length position 13 in the blade spanwise direction of the blade body 3. Herein, the maximum chord-length position is the position where the chord length is at its maximum in the blade spanwise direction of the blade body 3.

This will now be described with reference to FIG. 3. In the region S, from among the fin sets 22 constituting the vortex generator 20, adjacent three fin sets 22A, 22B, and 22C are disposed at different positions from one another in the blade spanwise direction. The fin sets 22A, 22B, and 22C include a pair of fins 23A, 23A, a pair of fins 23B, 23B, and a pair of fins 23C, 23C, respectively.

In FIG. 3, the line O' and the line O" are parallel to the center axis O of the blade root 7. The line $L_1$ passes through the center $C_A$ of the fin set 22A and the center $C_B$ of the fin set 22B. The line $L_2$ passes through the center $C_B$ of the fin set 22B and the center $C_C$ of the fin set 22C.

A line that connects two adjacent fin sets 22 refers to a line that connects corresponding points of the fin sets 22. For instance, the line may connect the respective centers of adjacent two fin sets 22.

In the example depicted in FIG. 3, in the planer development view of the surface of the blade body 3, the angle $\theta_1$ formed between the line O' parallel to the center axis O of the blade root 7 and the line $L_1$ connecting the adjacent two fins sets 22A, 22B in the blade spanwise direction, and the angle $\theta_2$ formed between the line O" parallel to the center axis O of the blade root 7 and the line $L_2$ connecting the two adjacent fin sets 22 in the blade spanwise direction, are both the above described angle θ.

In the example depicted in FIG. 3, the fin sets 22A, 22B, 22C in the region S are arranged so that the angle θ increases with distance toward the blade root 7. In other words, the angle $\theta_1$ defined by the adjacent fin sets 22A, 22B disposed closer to the blade root 7 is larger than the angle $\theta_2$ defined by the adjacent fin sets 22B, 22C disposed further from the blade root 7.

The adjacent fin sets 22 arranged so that the angle θ increases toward the blade root 7 are positioned so that the fin set 22 closer to the blade root 7 (e.g. the fin set 22A of the fin sets 22A and 22B) has a smaller distance from the leading edge 11. In other words, the line connecting two adjacent fin sets 22 (e.g., line $L_1$ and line $L_2$) is inclined from the center axis O (or the line O' or the line O") of the blade root 7, so as to get closer to the trailing edge 12 with distance toward the blade tip 8.

As a result of intensive researches by the present inventors, it was found that, in a region on the side of the blade root 7 of the wind turbine blade 2, with distance toward the blade root 7 of the wind turbine blade 2 along the blade spanwise direction of the wind turbine blade 2, a wind flow separates on the surface of the wind turbine blade 2 at a position closer to the leading edge, and the degree of change in the position of separation relative to a change in the position in the blade spanwise direction is greater.

In view of this, for the wind turbine blade 2 according to the above embodiment, the plurality of fin sets 22 constituting the vortex generator 20 are positioned so that, in a planar development view of the surface of the blade body 3, the angle θ formed by the center axis O of the blade root 7 and the line L connecting two adjacent fin sets 22 in the blade spanwise direction increases toward the blade root 7, in at least a part of a region between the position of the blade root 7 and the maximum chord-length position 13 in the blade spanwise direction of the blade body 3. Accordingly, the fins 23 are disposed corresponding to the position of separation of a flow that changes in response to the change in the position in the blade spanwise direction, and thereby it is possible to effectively retard the separation of a flow on the surface of the wind turbine blade. Thus, it is possible to improve the operational efficiency of the wind turbine (e.g. the wind turbine power generating apparatus 1) to which the wind turbine blade 2 is mounted.

Figure 4:
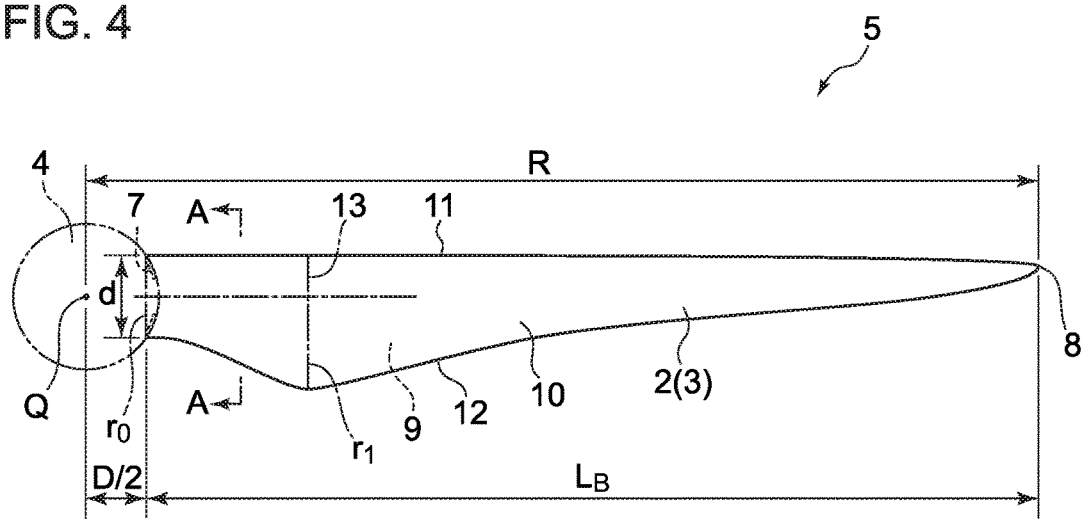
FIG. 4 is a schematic diagram of a wind turbine blade according to an embodiment.

FIG. 4 is a schematic diagram of a wind turbine blade according to an embodiment. In FIG. 4, the wind turbine blade 2 is depicted with the hub 4 to which the wind turbine blade 2 is mounted.

In FIG. 4, $r_0$ is the position of the blade root 7 in the blade spanwise direction; $r_1$ is the maximum chord-length direction in the blade spanwise direction (the position indicated by the reference numeral 13 in FIG. 2); d is the outer diameter of the blade body 3 at the blade root position $r_0$; D is the diameter of the hub 4; Q is the rotational center of the wind turbine rotor 5 including the wind turbine blade 2 and the hub 4; and R is the distance between the rotational center Q of the wind turbine rotor 5 and the tip 8 of the blade body 3.

In an embodiment, the plurality of fin sets 22 are positioned so that the angle θ satisfies the following expression (A) in at least a part of the region between the blade root position $r_0$ and the maximum chord-length position $r_1$, where λ is the design tip speed ratio of the wind turbine provided with the wind turbine blade 2 mounted thereto, r is the distance between the rotational center Q of the rotor 5 and the fin set 22 that is disposed closer to the blade root 7 of the two adjacent fin sets 22, and μ is the dimensionless radial position, which is a ratio (r/R) of r to R.

$$3° \leq \theta \leq \frac{d}{2\lambda\mu^2 R} \times \frac{180}{\pi} [°] \quad (A)$$

As a result of intensive researches by the present inventors, it was found that, in a region near the blade root in the blade spanwise direction of a wind turbine blade, a flow separates on the blade surface at a position corresponding to the angle ψ represented by the following expression (B) in a planar development view of the surface of the blade body.

$$\psi = \frac{d}{2\lambda\mu^2 R} \times \frac{180}{\pi} [°] \quad (B)$$

The derivation of the above expression (B) will now be described.

Figure 5:
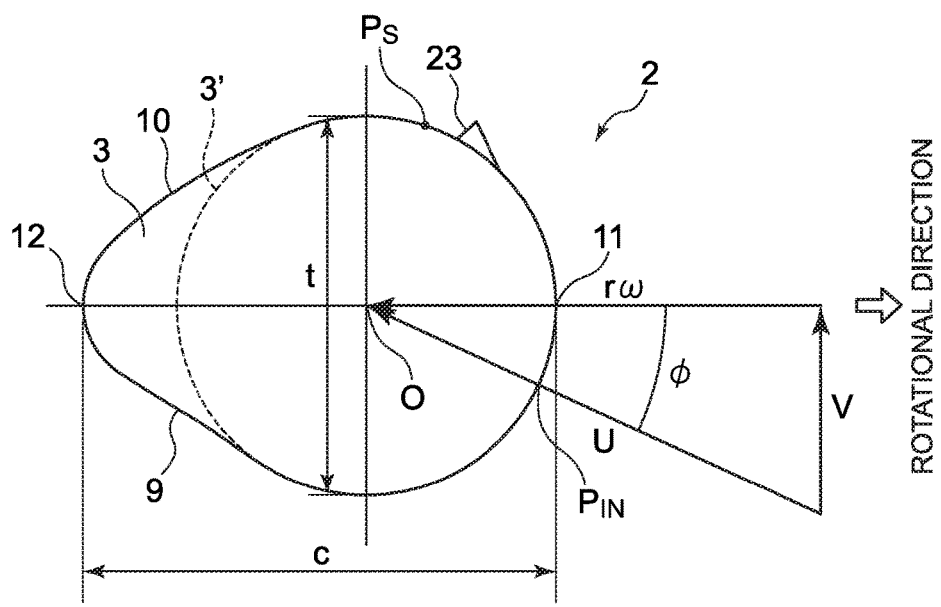
FIG. 5 is a schematic cross-sectional view taken along line A-A of the wind turbine blade depicted in FIG. 4.

FIG. 5 is a schematic cross-sectional view taken along line A-A of the wind turbine blade 2 depicted in FIG. 4. With respect to the blade spanwise direction of the blade body 3 depicted in FIG. 4, the shape of the blade body 3 on the side of the leading edge 11 can be approximated by a cylinder in the region indicated by arrows A-A. FIG. 5 is a cross-sectional view in which the side of the leading edge 11 of the blade body 3 is approximated by a cylinder, to describe the derivation of the expression (B). In FIG. 5, the reference numeral 3' is a cross section of a cylinder approximating the side of the leading edge 11 of the blade body 3.

Provided that FIG. 5 is a cross-sectional view of the wind turbine blade 2 taken at a position at the distance r from the rotational center Q of the rotor 5 (simply referred to as the radial directional position r), in FIG. 5, c is the chord length of the blade body 3 at the radial directional position r; t is the blade thickness of the blade body 3 at the radial directional position r; rω is the tip-speed vector of the rotor 5 at the radial directional position r; V is the wind-velocity vector; U is the relative inflow wind-velocity vector; φ is the inflow angle of wind formed with the wind turbine blade 2; $P_{IN}$ is the inflow position of wind, and $P_{VG}$ is the installation position of the fin set 22 that constitutes the vortex generator 20.

FIG. 5 is a cross-sectional view of the side of the leading edge 11 of the blade body 3 approximated by a cylinder, and thus the ratio of the chord length c to the blade thickness t in FIG. 5 may be different from the actual ratio of the chord length c to the blade thickness t of the blade body 3.

The inflow angle φ of flow with respect to the wind turbine blade 2 can be approximated by an expression φ≈V/rω. Defining the dimensionless radial position as μ=r/R and the tip speed ratio as λ=Rω/V, the inflow angle φ can be expressed as follows.

$$\varphi = \frac{V}{r\omega} = \frac{V}{R\omega} \times \frac{1}{r/R} \quad (C)$$
$$= \frac{1}{\lambda} \times \frac{1}{\mu} [rad]$$

Further, provided that Δμ is the amount of change of the dimensionless radial position μ and Δφ is the amount of change of the inflow angle φ when the radial directional position r changes by a minute amount Δr, Δφ can be described as follows, from the above expression (C).

$$\Delta\varphi = -\frac{1}{\lambda} \times \frac{\Delta\mu}{\mu^2} [rad] \quad (D)$$

Now, assume that, at any radial directional position r, wind flowing in from the position $P_{IN}$ on the blade surface passes through the leading edge 11 and advances a predetermined distance along the blade surface to reach a position $P_S$ on the suction surface 10 where separation of a flow occurs. In this case, in a planar development view of the blade body 3, the angle ω' formed by the center axis O of the blade root 7 with the line passing through the position of separation of a flow at the radial directional position r and the position of separation of a flow at the radial directional position (r+Δr) can be expressed as follows, using Δr and Δφ.

$$\psi' \cong \frac{\frac{d}{2} \times \Delta\varphi}{\Delta r} = \frac{d}{2} \times \frac{\Delta\varphi}{\Delta r} [rad] \quad (E)$$

From the above expressions (D) and (E), the angle ω' can be expressed as follows.

$$\psi' \cong \frac{d}{2} \times \frac{-\frac{1}{\lambda} \times \frac{\Delta\mu}{\mu^2}}{\Delta r} = \frac{1}{2} \times \frac{1}{\lambda} \times \frac{1}{\mu^2} \times d \times \frac{-\Delta\mu}{\Delta r} \quad (F)$$
$$= -\frac{1}{2} \times \frac{1}{\lambda} \times \frac{1}{\mu^2} \times \frac{d}{R} [rad]$$
$$= -\frac{d}{2\lambda\mu^2 R} \times \frac{180}{\pi} [°]$$

Defining ψ as the absolute value of ω' expressed by the above equation (F) (ψ=|ψ'|), the above expression (B) can be obtained.

With the above expression (B), the position of separation on the blade surface corresponding to the angle ψ changes in response to the dimensionless radial position μ.

In this regard, if the angle θ satisfies the above expression (A) in at least a part of a region between the blade root position $r_0$ and the maximum chord-length position $r_1$ as in the above embodiment, the angle θ is not more than ψ expressed by the above equation (B) in the region, and thus the fins 23 and the fin set 22 are positioned closer to the leading edge 11 than the position $P_S$ at which a flow separates on the blade surface (see FIG. 5), which makes it possible to retard separation of a flow on the blade surface more effectively. Further, if the angle θ satisfies the above expression (A) as in the above described embodiment, the angle θ is at least 3°, and it is possible to achieve a sufficient effect to retard separation of a flow on the surface of the wind turbine blade, at a position relatively close to the tip 8.

Provided that D/2 is the distance from the rotational center Q of the wind turbine rotor 5 to the blade root 7 (see FIG. 4), $L_B$ is the blade length of the blade body 3 (distance from the blade root 7 to the blade tip 8) (see FIG. 4), and $r_B$ is the distance from the blade root 7 in the blade spanwise direction, the above expression (A) can be rewritten into the following expression (G), from expressions μ=r/R, R=$L_B$+D/2, and r=$r_B$+D/2.

$$3° \leq \theta \leq \frac{d(L_B + D/2)}{2\lambda(r_B + D/2)^2} \times \frac{180}{\pi} [°] \quad (G)$$

Thus, in an embodiment, the plurality of fin sets 22 may be positioned so that the angle θ satisfies the above expression (G) in at least a part of the region between the blade root position $r_0$ and the maximum chord-length position $r_1$.

In a typical wind turbine, the distance (D/2) from the rotational center Q of the wind turbine rotor 5 to the blade root 7 is approximately 1.0 to 3.0 m. Thus, in an embodiment, the plurality of fin sets 22 may be positioned so that the angle θ satisfies the following expression (H) in at least a part of the region between the blade root position $r_0$ and the maximum chord-length position $r_1$.

$$3° \leq \theta \leq \frac{d(L_B + 1.0)}{2\lambda(r_B + 1.0)^2} \times \frac{180}{\pi} [°] \quad (H)$$

The above expression (H) is obtained by substituting (D/2)=1.0 into the above expression (G). In this case, it is possible to specify the range of the angle θ with the blade length $L_B$ of the blade body 3 and the distance $r_B$ from the blade root 7, regardless of the distance (D/2) from the rotational center Q of the wind turbine rotor 5 to the blade root 7, and the distances R, r from the center of the rotor 5.

Further, in a typical wind turbine, the design tip speed ratio λ is approximately 8 to 11, and a ratio (d/R) of the outer diameter d of the blade body 3 at the blade root position to the distance R between the rotational center Q of the wind turbine rotor 5 and the tip 8 of the blade body 3 is approximately 0.047 to 0.053.

Thus, in some embodiments, the plurality of fin sets 22 may be positioned so that the angle θ satisfies an expression θ≤(0.0034/μ²)×(180/π) [° ], in a case where the angle θ satisfies the above expression (A) in at least a part of the region between the blade root position $r_0$ and the maximum chord-length position $r_1$.

Alternatively, in some embodiments, the plurality of fin sets 22 may be positioned so that the angle θ satisfies an expression θ≥(0.0021/μ²)×(180/π) [° ], in a case where the angle θ satisfies the above expression (A) in at least a part of the region between the blade root position $r_0$ and the maximum chord-length position $r_1$.

For a typical wind turbine blade 2, if the angle θ satisfies an expression θ≤(0.0034/μ²)×(180/π) [° ], the angle θ is prevented from being excessively large with respect to the amount of change in the position of separation relative to the change in the position in the blade spanwise direction, and thus it is possible to enjoy the effect to retard separation in a wider range in the blade spanwise direction at the blade root 7. Furthermore, for a typical wind turbine blade 2, if the angle θ satisfies an expression θ≥(0.0021/μ²)×(180/π) [° ], the angle θ is prevented from being excessively small with respect to the amount of change in the position of separation relative to the change in the position in the blade spanwise direction, and thus it is possible enjoy the effect to retard separation in a wider range in the blade spanwise direction at the blade root 7.

Accordingly, it is possible to effectively retard the separation of flow on the surface of the wind turbine blade. Thus, it is possible to improve the operational efficiency of the wind turbine (e.g. the wind turbine power generating apparatus 1).

Figure 6:
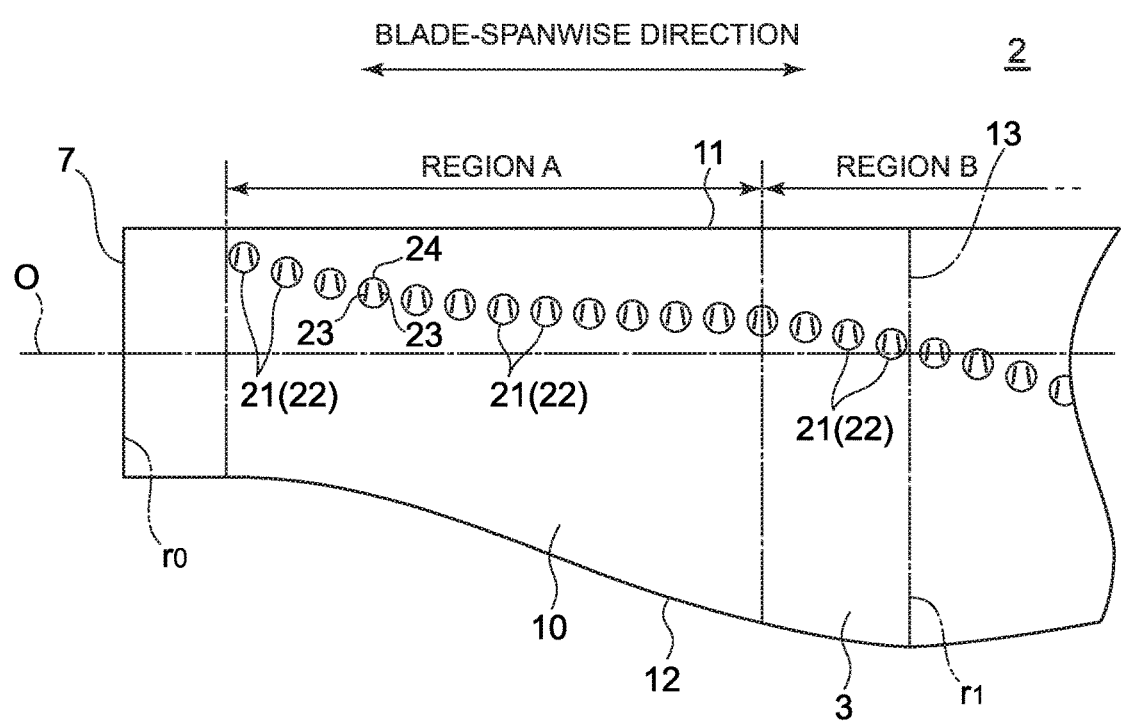
FIG. 6 is a schematic diagram of a part of a wind turbine blade according to an embodiment.

FIG. 6 is a schematic diagram of a part of a wind turbine blade according to an embodiment. In FIG. 6, the fin set 22 comprises a VG unit (see FIG. 7) described below.

As described above, in some embodiments, the plurality of fin sets 22 may be positioned so that the angle θ increases toward the blade root 7, in a region (region A in FIG. 6) which is at least a part of the region between the position of the blade root 7 ($r_0$) and the maximum chord-length position 13 ($r_1$) in the blade spanwise direction.

In some embodiments, the above mentioned region A is a range where the dimensionless radius position μ (μ=r/R) satisfies 0.10≤μ≤0.15.

In a typical wind turbine blade 2, the region where μ satisfies an expression 0.10≤μ is positioned away by some distance from the installation position of the wind turbine blade 2 to the hub 4, and thus it is possible to expect some effect to improve the performance of the wind turbine from mounting the vortex generator 20 to the wind turbine blade 2. In a typical wind turbine blade 2, in the region where μ satisfies an expression μ≤0.15, the shape on the side of the leading edge 11 of the wind turbine blade 2 can be approximated accurately by a cylinder as depicted in FIG. 5 for example, and thus it is possible to retard separation of a flow on the surface of the wind turbine blade effectively.

Alternatively, in some embodiments, the above region A is a region in the blade spanwise direction where the blade-thickness ratio (t/c), which is a ratio of the blade thickness t of the blade body 3 (see FIG. 5) to the chord length c of the blade body 3 (see FIG. 5), satisfies an expression 70%≤(t/c)≤85%.

In a typical wind turbine blade 2, the region where the blade thickness ratio (t/c) satisfies an expression (t/c)≤85% is positioned away by some distance from the installation position of the wind turbine blade 2 to the hub 4, and thus it is possible to expect some effect to improve the performance of the wind turbine from mounting the vortex generator 20 to the wind turbine blade 2. Further, in a typical wind turbine blade 2, in the region where the blade thickness ratio (t/c) satisfies an expression 70%≤(t/c), the shape on the side of the leading edge 11 of the wind turbine blade 2 can be approximated accurately by a cylinder, and thus it is possible to retard separation of a flow on the surface of the wind turbine blade effectively.

Furthermore, in some embodiments, as depicted in FIG. 6, a plurality of fin sets 22 or fins 23 may be provided for the vortex generator 20, at least in a region B disposed closer to the blade tip 8 than the region A. In the region B, the plurality of fin sets 22 or fins 23 may be disposed along a line defined on the blade surface.

Figure 7:
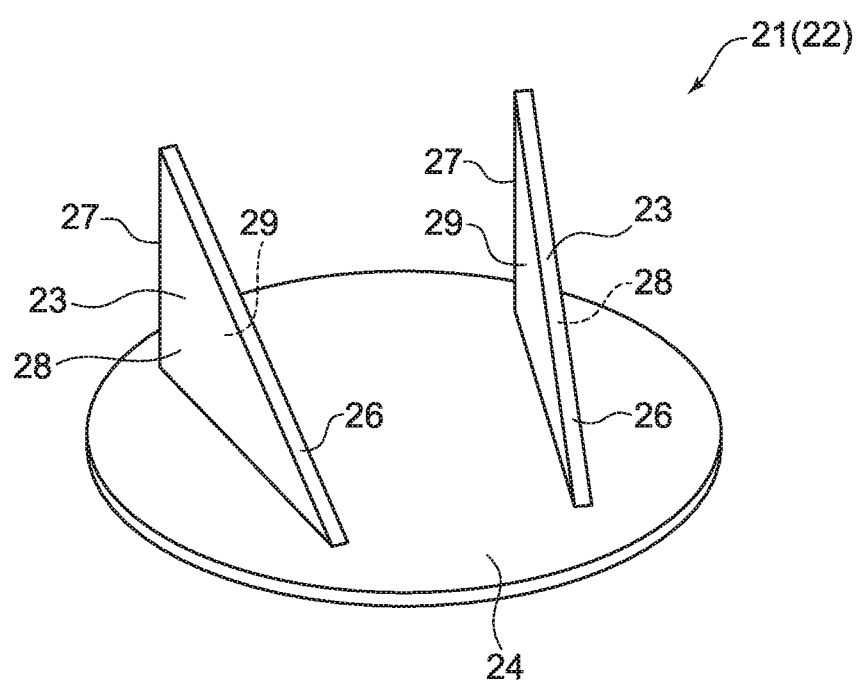
FIG. 7 is a schematic configuration diagram of a VG unit according to an embodiment.

FIG. 7 is a schematic configuration diagram of a VG unit according to an embodiment.

The VG unit 21 depicted in FIG. 7 includes a platform portion 24 fixed to the surface of the blade body 3, and two fins 23 erected on the platform portion 24. The platform portion 24 may be fixed to the surface of the blade body 3 via an adhesive agent such as a double-faced tape.

In some embodiments, the pair of fins 23 each has an airfoil shape. The fin 23 includes a leading edge 26 disposed on an upstream side with respect to the inflow direction of wind, a trailing edge 27 disposed on a downstream side with respect to the inflow direction of wind, a pressure surface 28 of the fin 23 facing toward upstream with respect to the inflow direction of wind, and a suction surface 29 of the fin 23 facing toward downstream with respect to the inflow direction of wind. The fins 23 form vortices as described above, and suppresses separation of a flow on the wind turbine blade 2.

In some embodiments, the fin set 22 may comprise a VG unit 21 having a pair (e.g. two) fins 23, 23 as described above.

Alternatively, in some embodiments, the fin set 22 may comprise a VG unit 21 having a single fin.

In a case where the fin set 22 comprises the VG unit 21 including the platform portion 24 fixed to the surface of the blade body 3 and the one or two fins 23 erected on the platform portion 24, it is possible to flexibly position the fins 23 by the unit of the VG unit 21 on the surface of the wind turbine blade. Accordingly, it is possible to arrange the plurality of fins 23 appropriately, and thereby it is possible to effectively retard separation of a flow on the surface of the wind turbine blade and to improve the operational efficiency of the wind turbine (e.g. the wind turbine power generating apparatus 1).

In some embodiments, the vortex generator 20 is disposed, on the suction surface 10 of the blade body 3, within a turbulent flow region of a wind flow along the suction surface 10. As described above, the vortex generator 20 including the fin sets 22 is disposed within a turbulent flow region of a wind flow along the suction surface 10, and thereby it is possible to effectively suppress separation of a flow from the suction surface 10.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A wind turbine blade, comprising:
a blade body; and
a vortex generator mounted to a surface of the blade body,
wherein the vortex generator includes a plurality of fin sets, each fin set including a plurality of fins disposed so as to protrude from the surface of the blade body at different positions from one another in a blade spanwise direction, and
wherein the plurality of fin sets is positioned so that, in a planar development view of the surface of the blade body, an angle θ formed by a center axis of a blade root of the blade body with a line connecting two of the fin sets which are adjacent in the blade spanwise direction increases toward the blade root, at least in a part of a region of the blade body between a position of the blade root and a maximum chord-length position of the blade body in the blade spanwise direction.

2. The wind turbine blade according to claim 1,
wherein the plurality of fin sets is positioned so that the angle θ satisfies, in at least a part of the region between the position of the blade root and the maximum chord-length position, an expression:

$$3° \leq \theta \leq \frac{d}{2\lambda\mu^2 R} \times \frac{180}{\pi} [°]$$

where d is an outer diameter of the blade body at the position of the blade root, λ is a design tip speed ratio of a wind turbine to which the wind turbine blade is mounted, R is a distance between a rotational center of a wind turbine rotor including the wind turbine blade and a tip of the blade body, r is a distance between the rotational center and the fin set which is disposed closer to the blade root of the two adjacent fin sets, and μ is a dimensionless radial position being a ratio (r/R) of r to R.

3. The wind turbine blade according to claim 2,
wherein the plurality of fin sets is positioned so that the angle θ satisfies an expression $\theta \leq (0.0034/\mu^2) \times (180/\pi)$ [°].

4. The wind turbine blade according to claim 2,
wherein the plurality of fin sets is positioned so that the angle θ satisfies an expression $\theta \geq (0.0021/\mu^2) \times (180/\pi)$ [°].

5. The wind turbine blade according to claim 1,
wherein the plurality of fin sets is positioned so that the angle θ increases toward the blade root, in a range where μ satisfies an expression 0.10≤μ≤0.15, where R is a distance between a rotational center of a wind turbine rotor including the wind turbine blade and a tip of the blade body, r is a distance between the rotational center and the fin set which is disposed closer to the blade root of the two adjacent fin sets, and μ is a dimensionless radial position being a ratio (r/R) of r to R.

6. The wind turbine blade according to claim 1,
wherein the plurality of fins is positioned so that the angle θ increases toward the blade root, at least in a region in the blade spanwise direction in which a blade thickness ratio (t/c) satisfies an expression 70%≤(t/c)≤85%, the blade thickness ratio (t/c) being a ratio of a blade thickness t of the blade body to a chord length c of the blade body.

7. The wind turbine blade according to claim 1, wherein each of the plurality of fin sets comprises a VG unit including: a platform portion fixed to the surface of the blade body; and one or two of the fins erected on the platform portion.

8. The wind turbine blade according to claim 1, wherein the vortex generator is disposed, on a suction surface of the blade body, in a turbulence region of a wind flow along the suction surface.

9. A wind turbine rotor, comprising:
the wind turbine blade according to claim 1; and
a hub to which the wind turbine blade is mounted.

10. A wind turbine power generating apparatus comprising the wind turbine rotor according to claim 9.

11. A method of mounting a vortex generator to a surface of a wind turbine blade, the vortex generator comprising a plurality of fin sets each of which includes a plurality of fins, the method comprising:
a step of mounting the plurality of fin sets to the wind turbine blade so that the plurality of fins protrude from the surface of the wind turbine blade at positions different from one another in a blade spanwise direction, and, in a planar development view of the surface of the wind turbine blade, an angle θ formed by a center axis of a blade root of the wind turbine blade with a line connecting two of the plurality of fin sets which are adjacent in the blade spanwise direction increases toward the blade root, at least in a part of a region of the wind turbine blade between a position of the blade root and a maximum chord-length position of the wind turbine blade in the blade spanwise direction.

12. The method of mounting a vortex generator according to claim 11, wherein the mounting step includes positioning the plurality of fin sets so that the angle θ satisfies, in at least a part of the region between the position of the blade root and the maximum chord-length position, an expression:

$$3° \leq \theta \leq \frac{d}{2\lambda\mu^2 R} \times \frac{180}{\pi} [°]$$

where d is an outer diameter of the wind turbine blade at the position of the blade root, λ is a design tip speed ratio of a wind turbine to which the wind turbine blade is mounted, R is a distance between a rotational center of a wind turbine rotor including the wind turbine blade and a tip of the wind turbine blade, r is a distance between the rotational center and the fin set which is disposed closer to the blade root of the two adjacent fin sets, and μ is a dimensionless radial position being a ratio (r/R) of r to R.

13. The method of mounting a vortex generator according to claim 12, wherein the mounting step includes positioning the plurality of fin sets so that the angle θ satisfies an expression θ≤(0.0034/$\mu^2$)×(180/π) [°].

14. The method of mounting a vortex generator according to claim 12, wherein the mounting step includes positioning the plurality of fin sets so that the angle θ satisfies an expression θ≥(0.0021/$\mu^2$)×(180/π) [°].

15. The method of mounting a vortex generator according to claim 11, wherein the mounting step includes positioning the plurality of fin sets so that the angle θ increases toward the blade root, in a range where μ satisfies an expression 0.10≤μ≤0.15, where R is a distance between a rotational center of a wind turbine rotor including the wind turbine blade and a tip of the wind turbine blade, r is a distance between the rotational center and the fin set which is disposed closer to the blade root of the two adjacent fin sets, and μ is a dimensionless radial position being a ratio (r/R) of r to R.

* * * * *